US012665937B2

(12) United States Patent
Chen

(10) Patent No.: US 12,665,937 B2
(45) Date of Patent: Jun. 23, 2026

(54) METHODS AND SYSTEM FOR IMPROVED CONTROL OF PRESENTATION AND EXPERIENCES IN VIDEO CONFERENCE

(71) Applicant: Adeia Guides Inc., San Jose, CA (US)

(72) Inventor: Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 300 days.

(21) Appl. No.: 18/128,915

(22) Filed: Mar. 30, 2023

(65) Prior Publication Data

US 2024/0333780 A1 Oct. 3, 2024

(51) Int. Cl.
| | |
|---|---|
| *H04L 65/403* | (2022.01) |
| *H04N 7/14* | (2006.01) |
| *H04N 7/15* | (2006.01) |

(52) U.S. Cl.
CPC ............. *H04L 65/403* (2013.01); *H04N 7/14* (2013.01); *H04N 7/141* (2013.01); *H04N 7/15* (2013.01); *G06T 2200/24* (2013.01); *G06T 2207/10016* (2013.01)

(58) Field of Classification Search
CPC ............... H04L 65/403; H04L 65/1069; H04L 12/1822; H04L 9/40; H04L 9/50; H04L 69/08; H04L 65/4015; H04L 65/1101; H04L 67/01; H04L 67/14; H04L 67/04; H04L 65/611; H04N 7/15; H04N 7/14; H04N 7/141; H04N 7/147; H04N 21/6125; H04N 5/272; H04N 7/181; H04N 21/64322; H04N 21/2187; H04N 21/4312; H04N 23/80; H04N 19/86;

H04N 21/2662; G06T 5/70; G06T 7/0002; G06T 2200/24; G06T 2207/10016; G06T 7/70
See application file for complete search history.

(56) References Cited

U.S. PATENT DOCUMENTS

| | | | |
|---|---|---|---|
| 9,769,425 B1 * | 9/2017 | Lee ........................... | H04N 7/15 |
| 10,834,358 B1 * | 11/2020 | Harrison .............. | H04N 5/2628 |
| 11,349,893 B1 * | 5/2022 | Viswanathan Iyer ........................ | |
| | | | H04L 65/756 |
| 11,671,561 B1 * | 6/2023 | Chang .................. | G06V 40/161 |
| | | | 348/14.08 |
| 11,825,237 B1 * | 11/2023 | Agrawal .............. | G06F 3/0488 |
| 12,301,785 B1 * | 5/2025 | Mahapatra ........... | H04N 19/156 |

(Continued)

OTHER PUBLICATIONS

"Apple App Store Preview—FaceTime", retrieved at https://apps. apple.com/us/app/facetime/id1110145091 on Mar. 22, 2023.

(Continued)

*Primary Examiner* — Quoc D Tran
(74) *Attorney, Agent, or Firm* — HG LAW LLP

(57) ABSTRACT

Systems and methods are provided herein for altering video feeds of a first device in a video conference according to a request of a second device in the video conference. The present disclosure identifies a first video captured by a first device for a video conference involving the first device and a second device, receives a user request for modification of video transmitted to a second device regarding the first video, adjusts the first video according to the user request to create a second video, wherein the second video is visibly distinct from the first video, and transmits the created second video for display at the second device.

20 Claims, 7 Drawing Sheets

(56)                           References Cited

U.S. PATENT DOCUMENTS

| | | | | |
|---|---|---|---|---|
| 2010/0166063 | A1* | 7/2010 | Perlman .............. | H04N 19/172 |
| | | | | 375/240.07 |
| 2015/0036051 | A1* | 2/2015 | Broberg ............... | G06T 7/0002 |
| | | | | 348/571 |
| 2017/0019633 | A1* | 1/2017 | Shaburov ............. | G06V 40/161 |
| 2018/0152667 | A1* | 5/2018 | Taine ........................ | G06T 7/11 |
| 2019/0180489 | A1* | 6/2019 | Antonyan ............. | G06T 11/001 |
| 2020/0358983 | A1* | 11/2020 | Astarabadi ............. | H04N 7/157 |
| 2020/0402214 | A1* | 12/2020 | Mukherjee ................ | G06T 7/11 |
| 2021/0352347 | A1* | 11/2021 | Arora .................... | H04L 65/612 |
| 2021/0392352 | A1* | 12/2021 | Aristarkhov ......... | H04N 19/503 |
| 2023/0388445 | A1* | 11/2023 | Agrawal ................ | G06V 20/40 |
| 2023/0409271 | A1* | 12/2023 | Agrawal ............. | G06F 3/04845 |
| 2024/0104742 | A1* | 3/2024 | Xu ............................ | G06T 7/33 |
| 2024/0233768 | A1* | 7/2024 | Braunstein ........... | G11B 27/031 |

OTHER PUBLICATIONS

"Apple iPhone User Guide—Edit Portrait mode photos on iPhone", retrieved at https://support.apple.com/guide/iphone/edit-portrait-mode-photos-iph310a9a220/ios on Mar. 22, 2023.

Hoff, Todd, "High Scalability Blog—A Short On How Zoom Works", http://highscalability.com/blog/2020/5/14/a-short-on-how-zoom-works.html#:~:text=Zoom%20chose%20the%20SVC%20(Scalable,want%20to%20send%20multiple%20bitrates., May 14, 2020.

Krukova, Alina, "6 Tips on How to Improve Your Video Call Quality", TrueConf Blog, retrieved at https://trueconf.com/blog/reviews-comparisons/video-call-quality.html, Apr. 25, 2022.

Sachdeva, Vikram, "Zoom—Video conf app at scale", Medium, retrieved at https://medium.com/@vsachdeva/zoom-video-conf-tool-at-scale-e86289c290b8, May 18, 2020.

* cited by examiner

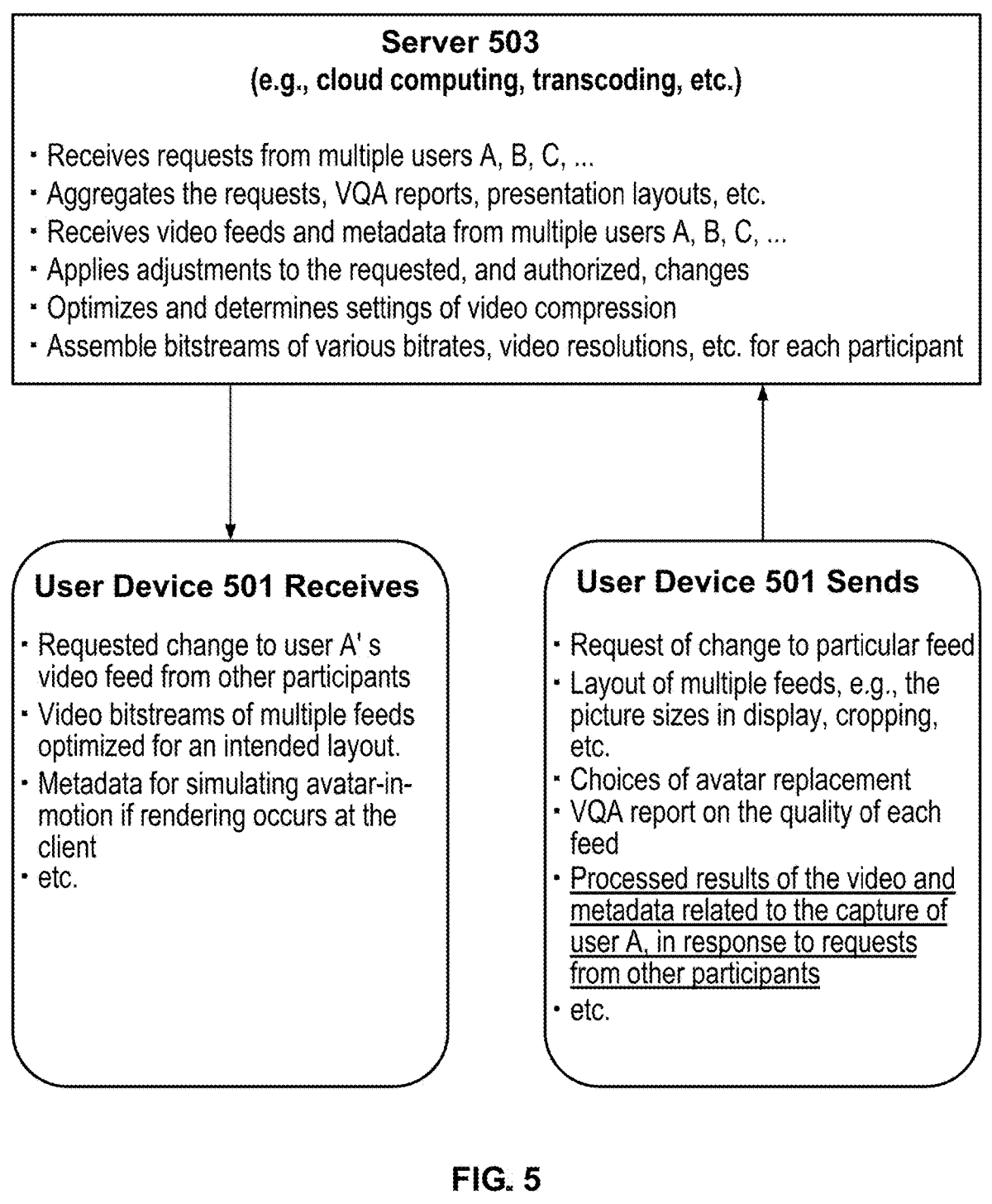

Server 503
(e.g., cloud computing, transcoding, etc.)

- Receives requests from multiple users A, B, C, ...
- Aggregates the requests, VQA reports, presentation layouts, etc.
- Receives video feeds and metadata from multiple users A, B, C, ...
- Applies adjustments to the requested, and authorized, changes
- Optimizes and determines settings of video compression
- Assemble bitstreams of various bitrates, video resolutions, etc. for each participant

User Device 501 Receives

- Requested change to user A' s video feed from other participants
- Video bitstreams of multiple feeds optimized for an intended layout.
- Metadata for simulating avatar-in-motion if rendering occurs at the client
- etc.

User Device 501 Sends

- Request of change to particular feed
- Layout of multiple feeds, e.g., the picture sizes in display, cropping, etc.
- Choices of avatar replacement
- VQA report on the quality of each feed
- Processed results of the video and metadata related to the capture of user A, in response to requests from other participants
- etc.

FIG. 5

METHODS AND SYSTEM FOR IMPROVED CONTROL OF PRESENTATION AND EXPERIENCES IN VIDEO CONFERENCE

TECHNICAL FIELD

One or more embodiments of the present disclosure relates to audio/video conferencing systems and methods, and more particularly, to systems and methods related to managing the background of video of other participants.

BACKGROUND

Video calls are a widely, daily used application which enable users to transmit video and audio to other participants in the form of a video feed. Users capture and upload a video feed using an electronic device. Another participant then receives the video feed using his or her own electronic device. Video settings are often set by the device capturing and uploading the video feed. In many instances, these devices upload the video feed at a high resolution. The high resolution may impede transmission however, ultimately reducing video quality at the receiving end.

SUMMARY

Herein disclosed is a method of adjusting the settings in processing and encoding a video feed in a video conference. Video conferences have become common place, even daily, occurrences in most office settings. Users regularly communicate with coworkers, clients, and others via video conferences. At the same time, more and more people are working remotely, meaning they are participating in video conferences and uploading video feeds in many different locations. Issues may arise when conference participants are in locations with limited network connections. Similarly, issues may arise when participants have bandwidth-intensive backgrounds that demand high bandwidth requirements to maintain high quality. Even putting aside bandwidth constraints, issues may arise when video conference participants take issue with the background of other participants. For example, one participant may find the background of another participant distracting, ugly, or otherwise offensive. Applications and systems may provide recommendations for video and audio settings on the capturing device to ensure good experiences in video calls and video conferences. However, the participant receiving the video feed may not receive the same visual experience as the participant to who uploads the video. In other words, the sender sees a high-quality capture on the local device but may not be aware of the actual picture quality at the receiver end. In these scenarios the receiving participant is not in control of others' networks or video background, although they might be the most affected by these circumstances. For example, one participant's complex background (e.g., an unaltered background with significant movement, a replacement moving background, etc.) may require bandwidth allocation exceeding that available (e.g., at his uplink or at the receiver's downlink), resulting in a choppy or blocky video of degraded quality for other participants. This may be especially noticeable if the transmitting participant suffers from low bandwidth availability at his uplink or if the receiving participant suffers from low bandwidth availability at his downlink. While this poor quality might be at least partially addressable by asking the participant to change his or her background to something less complex (e.g., a still-image replacement background), asking a participant to adjust his or her video background is not preferrable as it can be disruptive or uncomfortable.

In some instances, techniques may be provided to enable a video conference participant to input a setting or settings to indicate that one or more received video feeds should be altered. This alteration may be provided at the receiving client device. However, such techniques do little to address problems with significant bandwidth requirements for the received video because the participant's video is hardly to be improved after having received the video of degrade quality.

Disclosed techniques address the described problems with received video feeds, for example, by enabling a participant to request or cause an adjustment to the video feeds of other video conference participants (e.g., prior to the video feeds being transmitted to the receiving participant) without the involvement of these fellow participants. By enabling these adjustments, disclosed techniques enable (for example) a receiving participant to improve the quality of received video feeds in certain situations or to address concerns with the aesthetic or distracting nature of a background. If desired, the receiving participant may modify a received video stream for other reasons.

In some instances, techniques are provided to enable a video conference participant to input a setting or settings to indicate that one or more received video feeds should be altered (e.g., at a server or at the uploading device) before being encoded and transmitted to the participant's device. These settings may be based on bitrate, display size, or other criteria and may be, for example, a specification to blur all user backgrounds, blur all backgrounds with the exception of the speaking participant, or remove any moving background. The settings may be automatically applied without further input from the receiving participant or a participant may select specific feeds and settings to apply. In some embodiments, the participant capturing, encoding and uploading the video feed is unaware of the adjustment. In some embodiments the adjustment is applied only to the display of the participant requesting to adjust the setting. In many scenarios, a server connected to the recording and display devices of each participant will process and transcode the video feeds to display the selected versions to each user according to each user's settings.

BRIEF DESCRIPTION OF THE DRAWINGS

The above and other objects and advantages of the disclosure will be apparent upon consideration of the following detailed description, taken in conjunction with the accompanying drawings, in which:

FIG. 5 is a flowchart illustrating data transfers between a user and the server, in accordance with some embodiments of the disclosure;

DETAILED DESCRIPTION

Figures 1A, 1B:
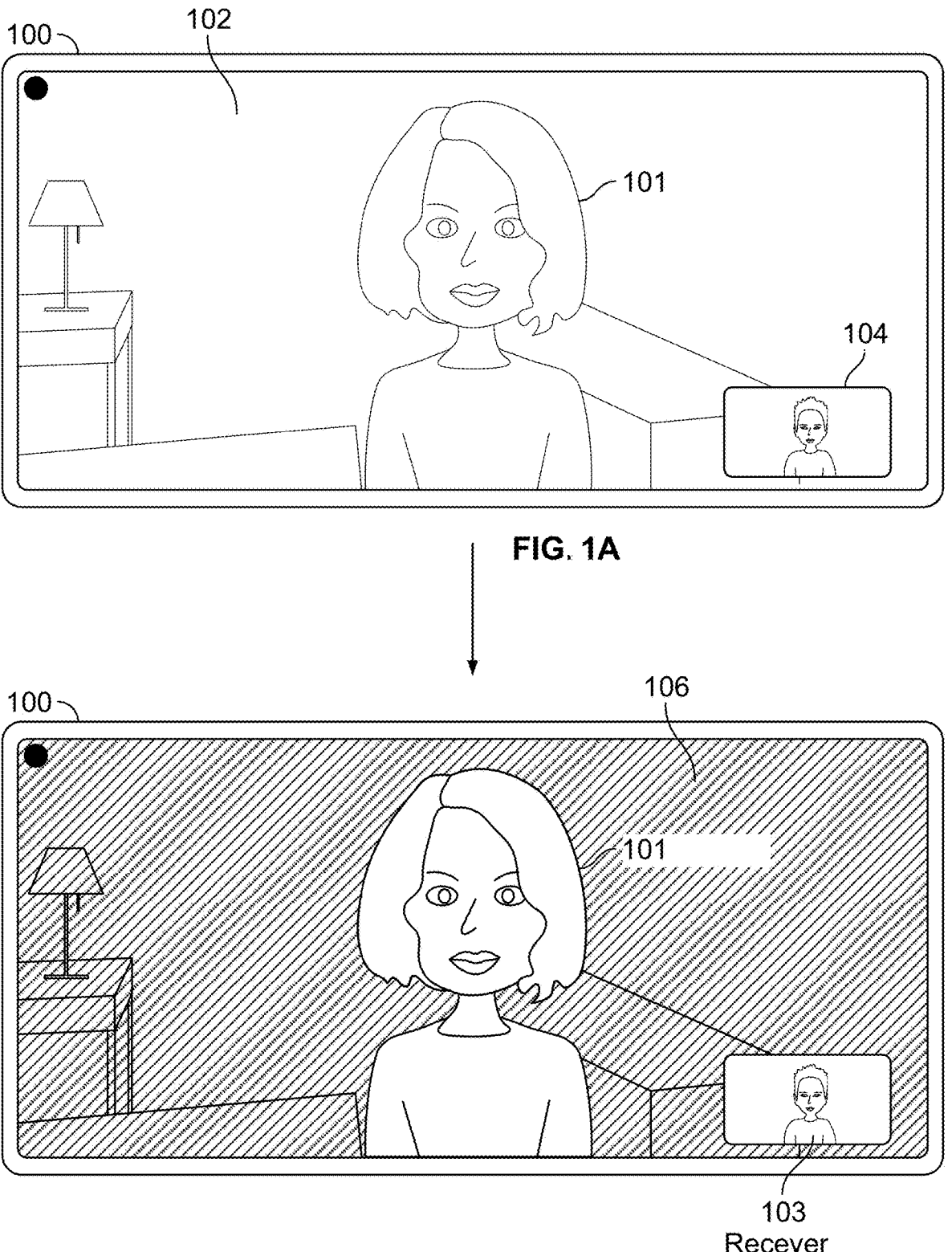
FIGS. 1A and 1B show example views of an audio/video-conference in accordance with some embodiments of the disclosure.

Methods and systems are provided herein for adjusting the video and its relevant settings of another participant on a video conference without involving the other participant to initiate the adjustment. For example, in a video conference involving first and second users, to improve performance, video from the second user's device may be modified to replace or blur a background behind the second user before the video is transmitted to the first user's device, thereby reducing bandwidth requirements needed to provide a high-quality video to the first user.

As a more specific example, the first device may capture a first video stream of the first user, the second device may capture a second video stream of the second user, and the two devices may upload the respective video streams to a server. The server may then transmit the first video stream to the second device, and it may transmit the second video stream to the first device. In some instances, all or some of the video streams received at the server may be merged into a single stream or video before being transmitted to the participating client devices. In any event, the disclosed techniques enable the first device, for example, to request a modification of the second video stream prior to the second video stream being transmitted to the first device. This request may be triggered based on input from the first user or may be automatically triggered based on a number of factors. This may be a general request to improve performance, or it may be a specific request (e.g., to blur a background, remove a background, replace a background, drop a resolution, etc.).

In any event, in response to the request from the first device, the second video stream may be modified. The modification may occur at the second device before being uploaded via an uplink to the server, or it may be modified at the server after it has received the second video stream from the second device and before the second video stream is downloaded to the first device via a downlink from the server. The modified second video or video stream may be transmitted as its own stream or may be provided as part of a merged video or video stream. As noted, modifying the second video stream may include removing or modifying a background of the second video. In some instances, modifying the second video stream may involve adjusting a setting of the second video stream, such as a bandwidth allocation or resolution. The nature of the modification may depend, at least partly, on display configuration factors (e.g., size of the displays, position of the displays, layout of the displays, etc.) or thresholds. Example thresholds include minimum acceptable video quality (e.g., indicated by resolution, frame rate, etc.), minimum acceptable bandwidth allocation, currently available bandwidth (e.g., at the downlink or uplink) etc. Threshold values may be stored or managed by the server and may be set by the service provider of the video conferencing application(s).

Turning to the figures, FIGS. 1A and 1B depict an exemplary alteration of an audio/video-conference between sender 101 and receiver 103 at two different points in time, time 111 and time 112, as seen on the device 100 of receiver 103. Both sender 101 and receiver 103 may be considered participants or users as these terms are used below. Receiver 103 receives audio and visual communications from sender 101 participating in the video conference. In some embodiments receiver 103 similarly sends audio and visual communications to sender 101 as part of the video conference. The display of device 100, shown in FIG. 1A, initially shows a portrait of sender 101 with an undesirable background 102 at time 111 prior to alteration. The background 102 may be undesired because it is, for example, poor quality due to low bandwidth in the uplink at the device of sender 101. The poor quality may be apparent by a pixelated representation which receiver 103 may find distracting. Other embodiments may contain other indications of poor quality as well. In other embodiment background 102 is undesirable for other reasons.

The receiver's 103 captured video 104 is displayed in the lower right-hand corner for the receiver 103 to view. This view allows the receiver 103 to know that his or her image is within the limits of the camera and can help the receiver 103 feel engaged.

In one embodiment in the event of an undesirable video quality or background 102, receiver 103 may request that the video or the settings be altered. In other embodiments portions of the video or the complete video may be altered as well or instead. Receiver 103 may explicitly request that a video is adjusted by user input such as a setting option "blur background," "solid background," "replace background," or "alter video display." In another embodiment the request is automatic such as when a certain condition or criteria (for example, video quality) is met. The request and alteration, whether explicit or automatic, may be enacted and retracted throughout the course of the video conference according to designations receiver 103 has indicated or other determining factors. In some embodiments, a server receives the request and video feeds from each participant in the conference, i.e., sender 101 and receiver 103 in this example. The server then processes the video feeds according to any requests and sends the processed video feeds to each of the participants. In one embodiment differently processed video feeds may be sent to different participants according to that participant's preferences.

FIG. 1B depicts a view of the same video seen in FIG. 1A at time 112 after an alteration responding to a request from receiver 103 is applied. As is evident comparing the FIGS, there is a visual distinction between the views of the FIGS, particularly in comparing the background. The background 102 while initially clear is obscured in FIG. 1B to create background 106. The portrait of sender 101 remains in focus in both FIGS. However, the background 102 is adjusted to meet a request sent by receiver 103. In that way, the receiver 103 is able to adjust the video to optimize his or her experience without impacting the interaction with (i.e., view of) sender 101. The two participants sender 101 and receiver 103 may continue their conversation without the distractions or issues that exist in FIG. 1A.

In one embodiment, issues with background 102 might affect the view of the portrait of sender 101. For example, if the available bandwidth on the device of sender 101 is too low, the entire video of sender 101, including both the background and the portrait of sender 101, may require bandwidth exceeding that available to provide high-quality video. When the required bandwidth exceeds that available in a scenario like this, the resulting video may be degraded, resulting in video that is low quality, choppy, or pixelated. In this embodiment, as the background 102 is altered, it will require a lower bandwidth and the bandwidth will be allocated to the portrait of sender 101, improving the image quality of the portrait of sender 101. As such in this embodiment, background 102 is blurred or otherwise altered to lower the bandwidth required for the video. In some embodiments, such bandwidth management is enacted when receiver 103 sends a request, for example, "improve portrait of subject" or "blur background," on his or her user device. A receiver 103 may enact this request in response to observing unacceptable video quality such as when sender 101 has an uplink bandwidth issue. In some embodiments, the request to control settings for improving video quality can also be made automatic when a video quality measurement takes place. Reference-free and reduced-reference video quality metrics can be applied before assessing the needs and initiating a request for adjustment. In some embodiments the adjustment is a control for improving video quality and is enacted in conjunction with a previously determined minimum acceptable bitrate. When the bitrate falls below the determined minimum acceptable bitrate, improvements to video quality can be applied. The adjustment may be removed when the bitrate rises above the determined minimum acceptable bitrate. Example adjustments or settings may include blurring background, removing the background, replacing the background, dropping video resolution, dropping frame rate, etc. A minimum acceptable video quality or bitrate may depend on display configuration factors, e.g., number of video feeds received at the second client, size of the video feeds, position of the video feeds, etc. In other words, the server may allocate bitrate based on target display configuration factors.

In some embodiments, blurring the background 102, and other available adjustments, reduces the required bitrate, improving the quality of other portions of the video, for example, the image of the sender 101. In some embodiments the effect of the request is visible on the device of sender 101. In other embodiments the effects of the request do not impact the view on device of sender 101 and sender 101 is unaware of the adjustments and request. In some embodiments other alterations are available in place of or addition to blurring the background 102 such as replacing the background with a static image or flat uniform pattern. In addition to blurring video background, other video settings, e.g., resolution and frame rate, etc. are also applicable for adjustment in some embodiments. When there are more than two participants in the video call, the adjustment may be initiated by multiple receivers. In the case of a centralized video conference system, the server may assess the cause of the quality issues and optimize for the best video quality across multiple participants.

The described video adjustments may also apply in other embodiments not concerning bitrate. For example, in one embodiment receiver 103 might choose to blur the background of a sender 101 if receiver 103 finds the background annoying or offensive. In such a scenario, it might be more appropriate and desirable that the receiver 103 requests to adjust the video settings without imposing on sender 101. In embodiments where adjustments are not connected with bitrate, the video may be post-processed to alter the background or other aspects.

Figure 2:
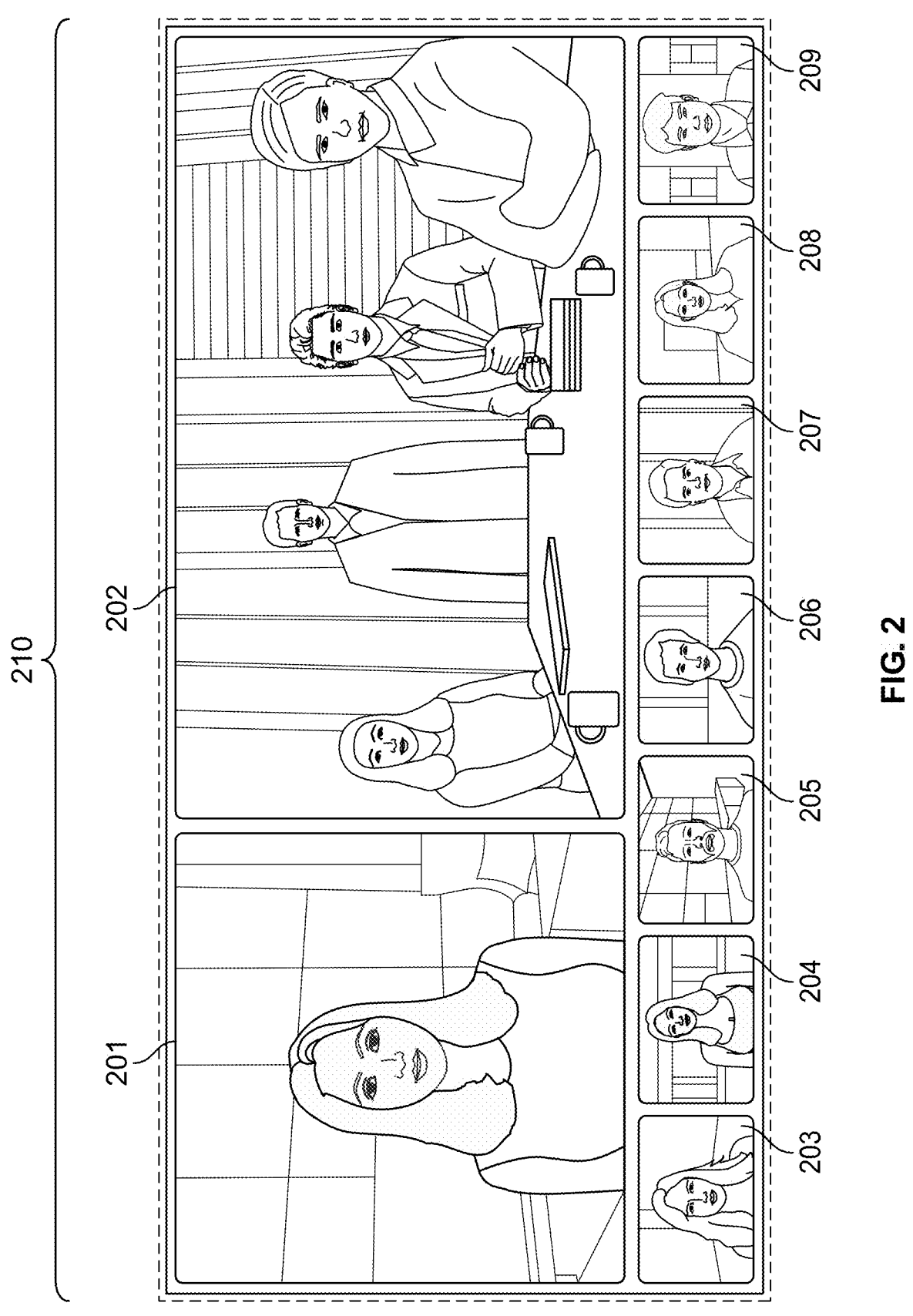
FIG. 2 illustrates an example display of an audio/video-conference involving more than two participants in accordance with some embodiments of the disclosure.

In another embodiment, where a video conference involves many participants (for example including sender 101 and receiver 103), bitrates are allocated to different video feeds. An example of this embodiment is shown in FIG. 2. In that figure, there are nine video feeds in the video conference, videos 201-209. Each video has a specific bandwidth, bitrate requirements and settings. Further each may be configured to different display sizes at the receiver end, as seen when comparing video 201 and 202, which are large, with videos 203-209 which are significantly smaller. The settings and bitrate requirements will vary considering what the minimum is for an acceptable perceived video quality of different feeds. Because each participant has a specific bandwidth, it is highly desirable to adapt the bitrate allocation to different video feeds to ensure consistency in perceived quality among different video feeds. The optimization may include choices of resolutions, frame rates, background, etc. The optimization may also include a joint optimization of server and client operations in capturing, processing, encoding/transcoding, etc.

In the example of FIG. 2, large videos 201 and 202 are displayed clearly on a receiver's 103 device 210. While video 202 is larger than video 201 the details of video 201 are also visible and so both videos will benefit from a clear picture. A high bitrate is allocated for those feeds. The other videos, 203-209, are displayed much smaller, making details less discernable and less important. As a result, a lower bitrate is allocated for those video feeds. In this way, bitrate can be prioritized where it is most useful.

FIG. 2 also shows an example of a non-static avatar in video 201. As seen in the figure, the participant of video 201 is a computer-generated image rather than a photo or video feed. Here, the user has replaced her image with a non-static avatar.

Figure 3:
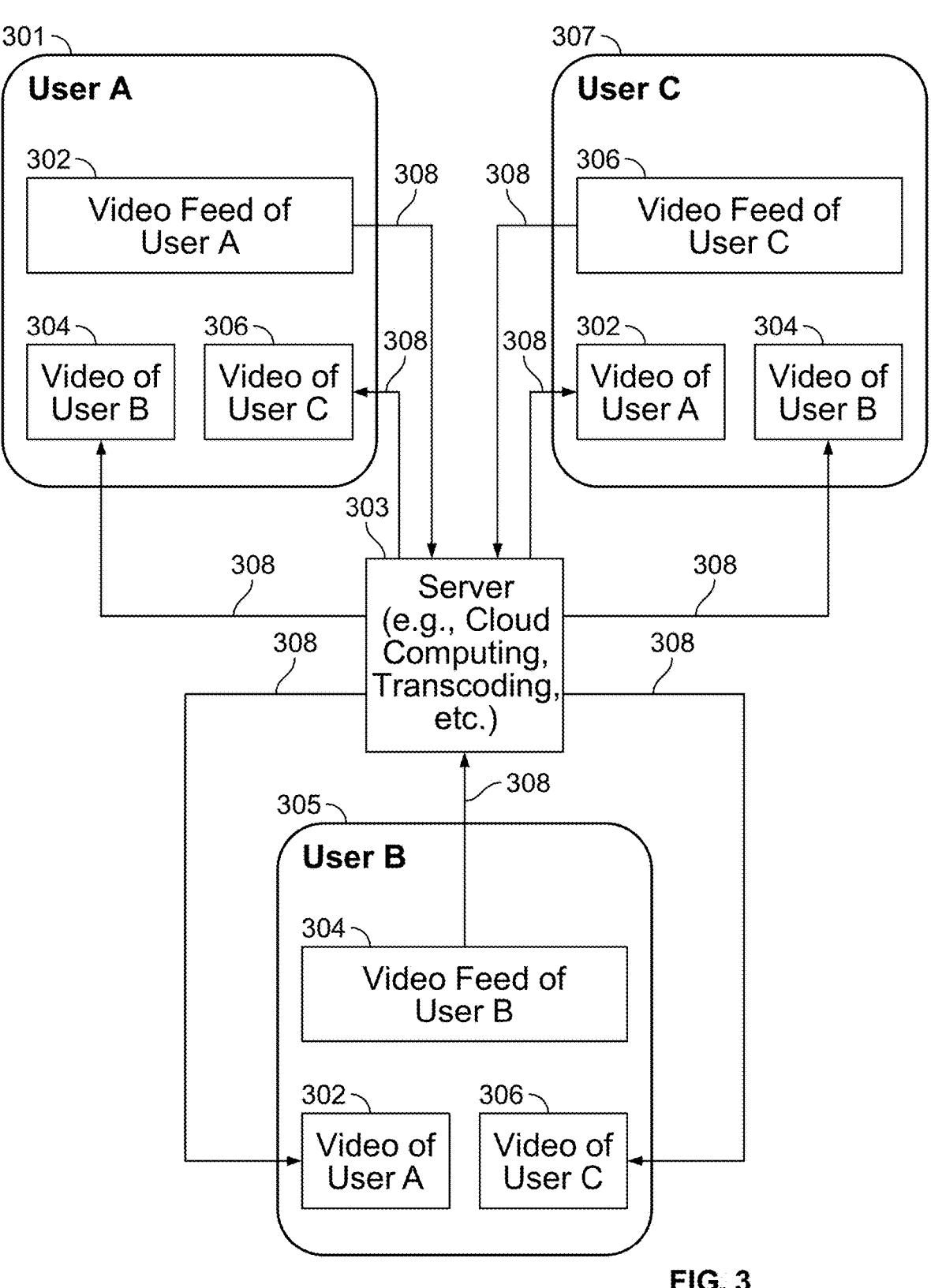
FIG. 3 simplified data flow of multiple participants in accordance with some embodiments of the disclosure.

FIG. 3 shows a simplified data flow between user devices of multiple participants, user devices 301, 305, and 307, in a video conference in one embodiment. User devices 301, 305, and 307 may each be for example one of sender 101 or receiver 103. Each of user devices 301, 305, and 307 is connected to server 303 via communication links. Communication links may be any communication link capable of connecting two devices, such as WiFi, cellular data, or other communication, or a combination thereof. User device 301 connects to the conference, sending video feed 302 to server 303 and receiving video 304 from user device 305 and video 306 from user device 307, also from server 303. User devices 305 and 307 have similar interactions. User device 305 sends video 304 to server 303 and receives videos 302 and 306 from server 303, while user device 307 sends video 306 to server 303 and receives videos 302 and 304.

Figure 4:
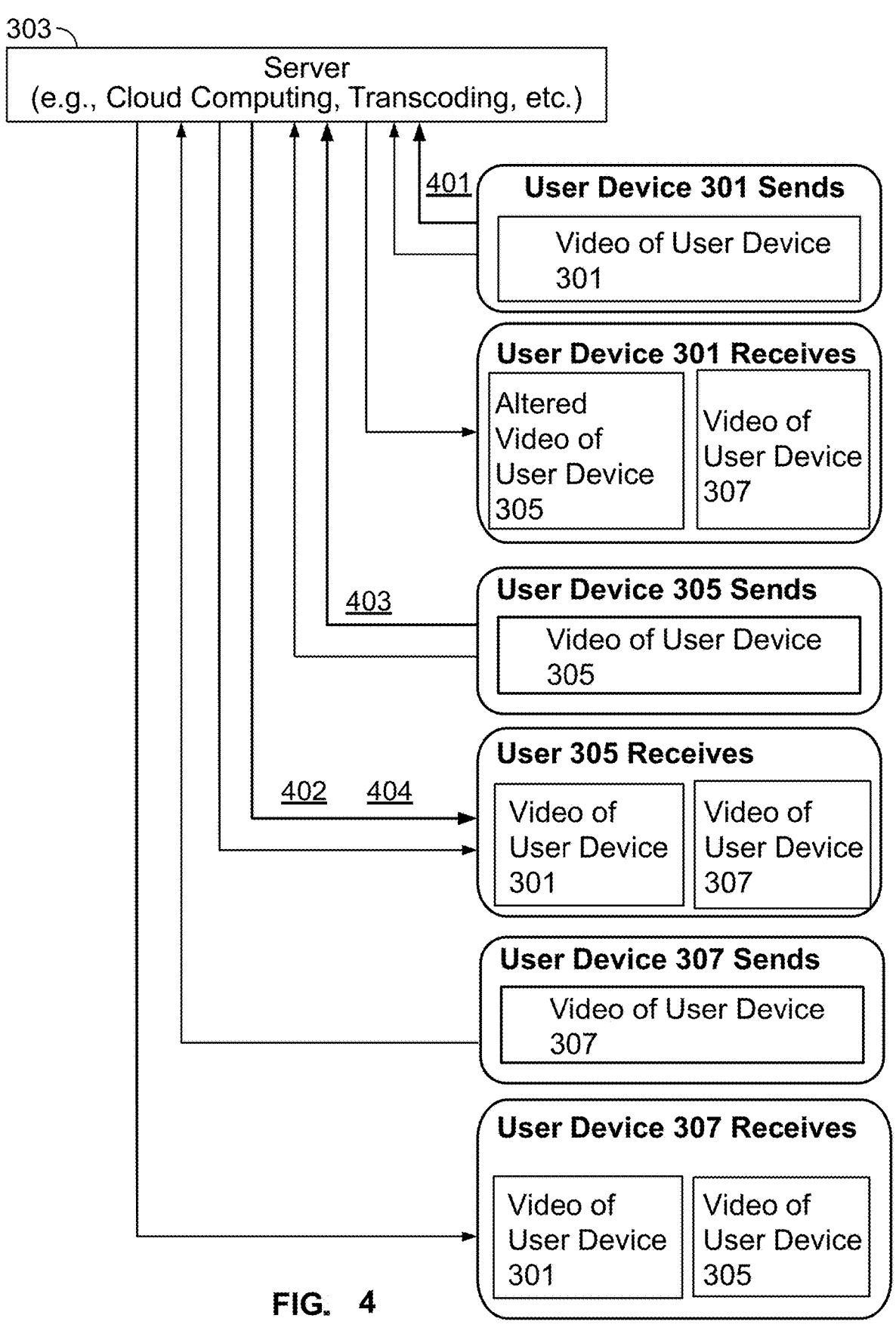
FIG. 4 is a diagram outlining the processes of user control and changes to the user experience that might take place in a video conference, in accordance with some embodiments of the disclosure.

FIG. 4 is a diagram outlining the processes of user control and changes to the user experience that might take place in an example video conference, similar to the one shown in FIG. 3. In FIG. 4, user device 301 sends a request via communication 401 on communication link 308 to alter the video of user 305. Server 303 receives the request. In response, the server 303 sends a request for video, in particular including a portrait video, to user device 305 via communication 402. Via communication 403, user device 305 sends the requested video, including a portrait video and its associated metadata, to server 303. Server 303 receives the new portrait video and metadata from user device 305. The server 303 then alters the received video of user device 305 according to the request of user device 301, creating a new altered video of user device 305. Server 303 next sends the altered video of user device 305 to user device 301 for display on the user device 301. User device 301 in turn displays the altered video of user 305 as desired. Finally, the server 303 sends a corresponding operation reproducing the action indicated by the request of user device 301 to user device 305 via communication 404 so that the effect may be reproduced and illustrated when desired. The control and adjustment of image background has been commonly used in capturing and editing portrait photos. Flexible depth control and manipulation can create variable effects. Meanwhile, user device 307, who has neither requested an altered video nor is the subject of such a request, sends and receives untouched video and is largely unaffected by the modification communications involving user devices 301 and 305. It should be noted that in some embodiments user device 307 will also receive altered video of user 305. For example, if user device 307 sends the same request as user device 301, both may receive the same altered video of user device 305. In one example, user device 305 has a weak network signal and, as a result, poor uplink communication. In this example, all devices receiving a video feed from user device 305 will receive a video feed with poor video quality. Therefore, because user devices 301 and 307 receive the same video feed from user device 305, both devices may send a request to alter the video feed from user device 305 to improve video quality and receive the altered video feed. On the other hand, if user device 301 receives a video feed from user 305 with poor video quality because user device 301 has a poor network connection itself, and user device 307 does not have a poor network connection, user devices 301 and 307 may receive difference video feeds from user device 305. In this scenario, user device 301 might request and receive an altered video feed from user 305 while user device 307 might not.

It should be noted that in the example outlined in FIG. 4, the processing of video of user device 305 to create the altered video 106 may take place on server 303. In some embodiments the processing may take place before being encoded and transmitted to the user devices of other users, for example user devices 301 or 305. The server-side processing and transcoding in general leverages more accessible video data and metadata of each user's feed. Therefore, it may be more flexible for the server-transcoding to apply the adjustment for a targeted participant and deliver the optimized content. This is a practically viable choice of settings in compression for video conferencing. The request by user device 301 may include a replacement of an intended background image or pattern. The server 303 implements the replacement, which is significantly more efficient than doing so at the user device 301. This way, the system can also optimize the video quality and presentation for each participant, where the configuration of layout may vary with dynamics.

FIG. 5 depicts further and more detailed transfers of data between one user device 501, a device through which a user participates in the video conference, and the server 503 in one embodiment. The user device 501 is linked to the server 503 by a user device, a device of a participant on the video conference used to display and/or participate in the conference. The user device 501 sends to the server 503 a request to change a particular feed, for example that of a specific participant in a context with multiple participants. The request may be to alter the feed as discussed above such as a request to blur the background of the feed or insert a static background. The user may also send server 503 the display layout of multiple feeds on the user device, including for example, the sizes of the feeds on the display of the user or any cropping. The user may also send choices of avatar replacement such a static or non-static avatar. In the case of using non-static avatar, only the metadata required to simulate an animated talking head is transmitted. User device 501 may also send a Visual Quality Assessment ("VQA") report on the quality of each feed which will inform the server 303 of video feeds that do not meet quality standards. The requests from a user device may be automatically initiated if video quality is a priority. In one embodiment, video quality assessment (VQA) can be automated at the client side, which can be enabled with reference-free or reduced-reference quality metrics. The measurement and report can then be used to evaluate the needs of bitrate for each feed, depending on the displayed picture size, required frame rate, etc.

In one embodiment server 503 receives requests from the user devices of users such as user device 501 and devices associated with user devices 301, 305, and 307. It aggregates the requests, VQA reports, layouts and other information. Server 503 also receives video feeds, metadata, and any other relevant information from user devices of users including user device 501. In some embodiments, metadata captured and derived by a user device, such as user devices 301, 305, 307, can be sent to server 503 for transcoding to serve one or more users devices. In some embodiments metadata may include information regarding specifics of the video feed relevant to altering that video feed. For example the metadata may indicate a shape of foreground and/or a subject in a video feed. In that scenario, one user request may be for a blurred background. The server may then use the metadata to quickly determine the region to be blurred, minimizing processing time and streamlining data transfers. In some embodiments, camera settings are no longer available when a video feed reaches the server 503. In such embodiments, generating relevant metadata on a user device such as 301, 305, 307, or 501, and uploading the metadata to a server 503 may be the most efficient.

Server 503 applies the requested adjustments to the requested images. In some embodiments requests may be authorized based on which video feed they act on. Server 503 may also in some embodiments optimize and determine settings of video compression.

In one embodiment, user device 501 receives from server 503 the requested change to the video feed user device 501 receives from other participants. This change is in the form of updated, or altered, video. In some embodiments, it applies only to the specific feed user device 501 receives and will not affect the feed other users in the same video conference receive, including the feed from the same participant whose video is altered for user device 501. User device 501 also receives from server 503, in some embodiments, video bitstreams of multiple feeds optimized for intended layout. In another embodiment the user device 501 receives metadata simulating avatar-in-motion if the rendering of an avatar occurs at user device 501. User device 501 may further receive additional data from server 503 not listed above.

Figure 6:
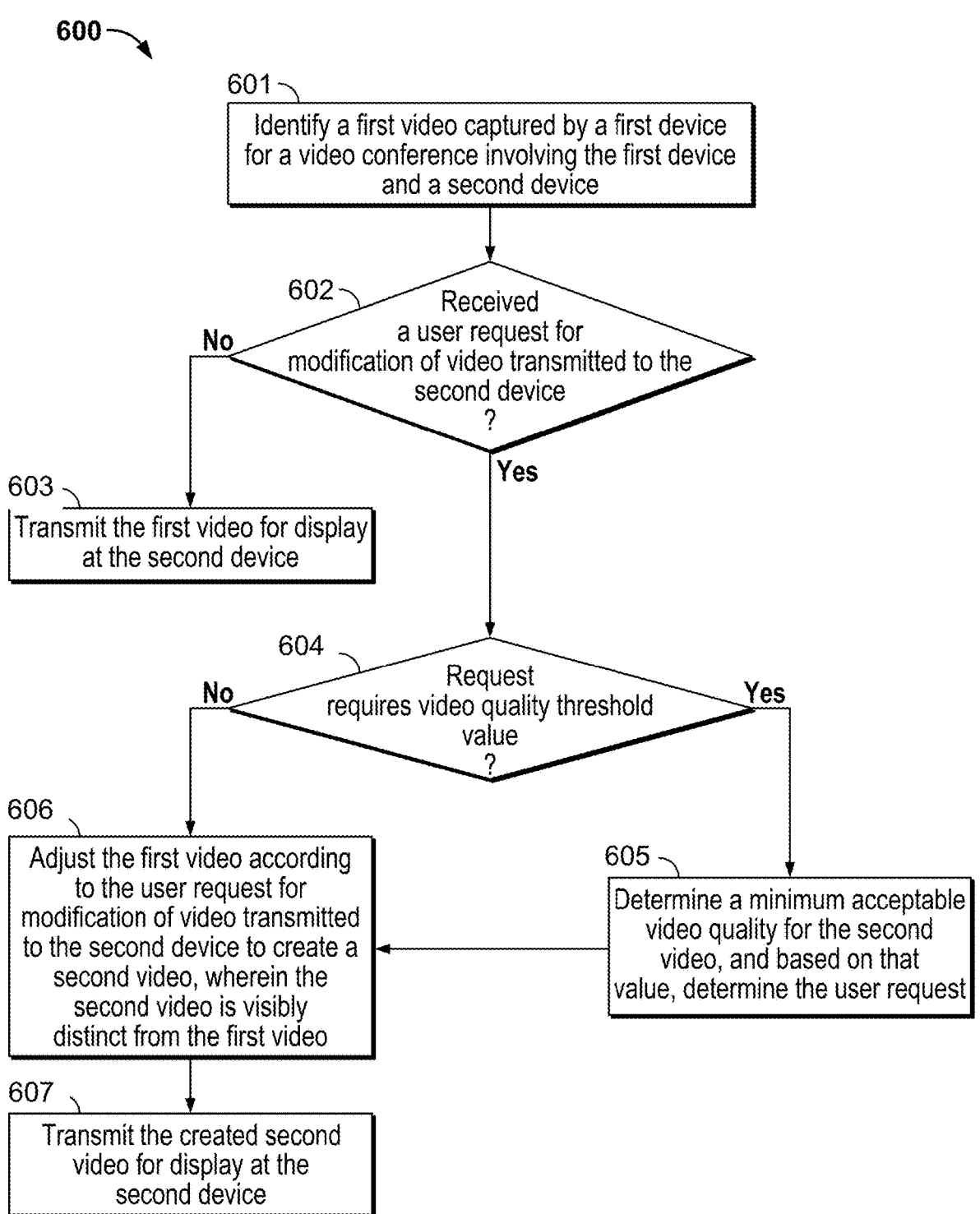
FIG. 6 is a flowchart illustrating an example method, in accordance with some embodiments of the disclosure.

FIG. 6 is a flowchart illustrating an example method 600 in one embodiment. The method 600 may be implemented, in whole or in part, by control circuitry, including processing circuitry, of, for example, a server connected to user devices. For example, anyone of the aforementioned systems or devices may execute one or more instructions or routines stored to memory or storage of a device to implement the method 600. The method 600 comprises at step 601 identifying a first video captured by a first device for a video conference involving the first device and a second device. That is, step 601 involves a conference between two users, a first user and a second user, where each user has his or her own device through which the user participates in the call. The users participate in the call by capturing video at their devices and sending the captured video to the other user. In return, each user receives the video of the other user. At step 602 the system determines if it has received a user request for modification of video transmitted to the second device. A request may be a request to, for example, blur the background of the transmitted video. If has not received such a request, the system transmits the first video for display at the second device at step 603. In one embodiment the request is tied to a threshold of video quality. In that embodiment, if the system has received a request at step 602, method 600 proceeds to step 604 where it determines if the request requires a video quality threshold value (e.g., a minimum acceptable video quality) for the second video. If the request requires a video quality threshold value, method 600 proceeds to step 605 where it determines a minimum acceptable video quality for the second video and based on that threshold value, determines the user request. Whether or not the request requires a threshold value, if the system has received a request, method 600 reaches step 606, where in response to the request, the system adjusts the first video according to the user request for modification of video transmitted to the second device to create a second video, wherein the second video is visibly distinct from the first video. Then, at step 607 it transmits the created second video for display at the second device. The second video is displayed and the user views the modified video.

Figure 7:
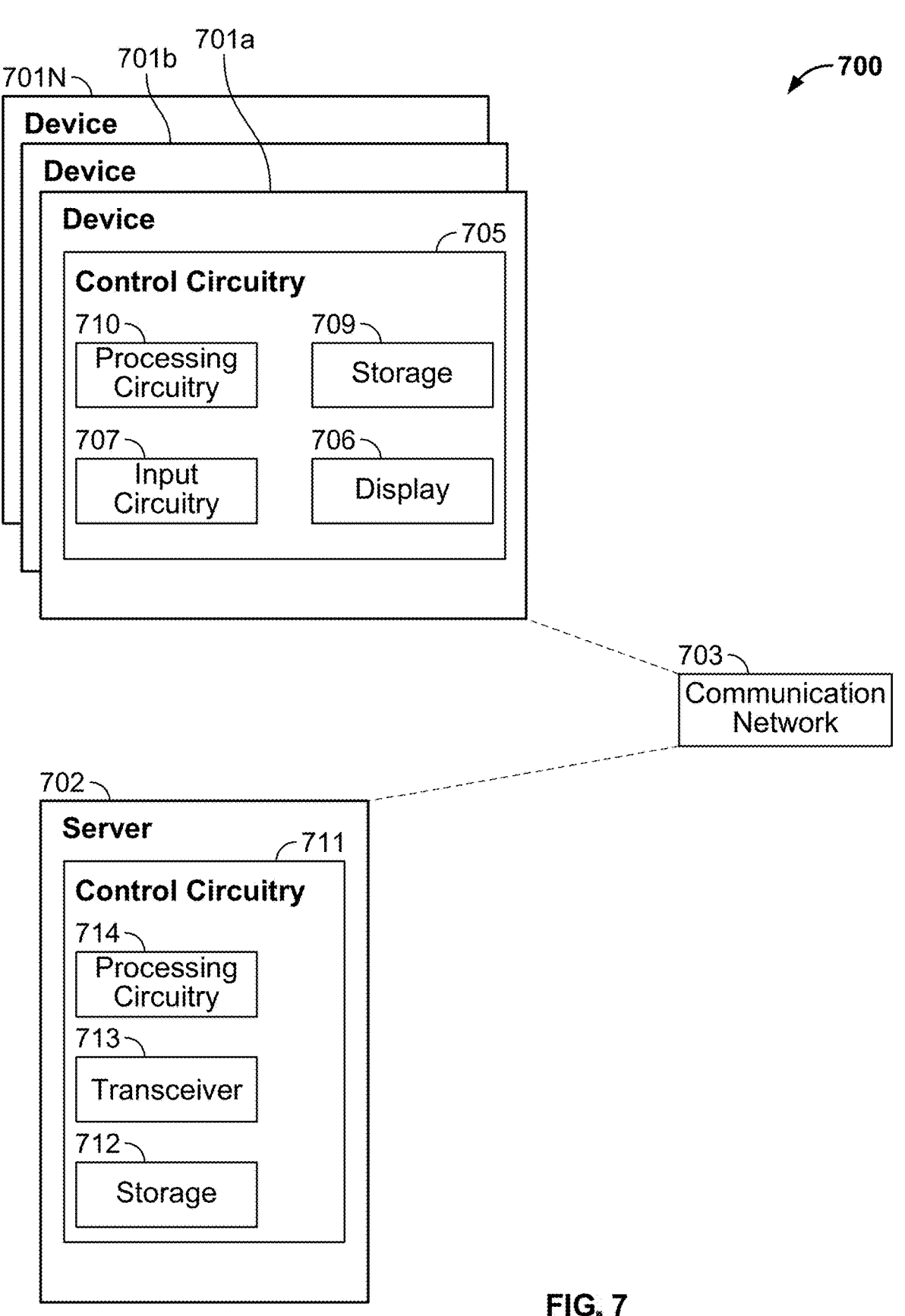
FIG. 7 is an illustrative block diagram showing an audio/video conferencing system, in accordance with some embodiments of the disclosure.

FIG. 7 is an illustrative block diagram showing an audio/video conferencing system 700 incorporating video adjustment features, in accordance with some embodiments of the disclosure. In an embodiment, one or more parts of or the entirety of system 700 may be configured as a system implementing various features, processes, and components of FIGS. 1-6. Although FIG. 7 shows a certain number of components, in various examples, system 700 may include fewer than the illustrated number of components and/or multiples of one or more of the illustrated number of components. For example, server 702 may include, or may be incorporated in, more than one server. Similarly, communication network 703 may include, or may be incorporated in, more than one communication network.

System 700 is shown to include user devices 701a through 701N, where N is any whole integer. User devices 701a through 701N are akin to, for example, user devices 301, 305, and 307 shown in FIG. 3 and may implement the same or similar functionality as described with respect to these user devices shown in FIG. 3. User devices 701a through 701N are devices through which a user participates in the video conference such as, for example, a smartphone or laptop computer. User devices 701a through 701N may receive a video feed of the user, upload the feed to a network, receive requests from the user, transmit requests to a server, receive video feeds of other users, and display video feeds.

User devices 701a through 701N includes its own control circuitry 705 for executing software commands and functions, display 706 for outputting video feed or other information to a user, and input circuitry 707 for receiving user input. Control circuitry 705 in turn includes transceiver circuitry 708 for communicating with other devices, storage 709 for data storage, and processing circuitry 710 which performs the necessary computing for executing functions. In some embodiments, computing devices 701a through 701N or control circuitry 705 may be configured as media devices.

Server 702 is shown communicatively coupled to user devices 701a through 701N through communication network 703. While not shown in FIG. 7, server 702 may be directly communicatively coupled to a user device 701, for example, in a system absent or bypassing communication network 703. Server 702 may further be communicatively coupled to each user device 701 in a system by different computing networks. Server 702 is akin to server 303 in FIG. 3 and may implement the same or similar functionality. Server 702 for example might receive video feeds of one or more users, process video feeds, receive a user request, process the request, and distribute video feeds among users. In one embodiment the server 702 also processes the captured videos, including making alterations as described herein, before distributing them.

Server 702 includes control circuitry 711 for executing software commands and functions, which includes storage 712 for storing data, transceiver circuitry 713 for communicating with other devices, and processing circuitry 714 which performs the necessary computing for executing commands. Storage 712 may be an electronic storage device. As referred to herein, the phrase "electronic storage device" or "storage device" should be understood to mean any device including tangible, non-transitory computer readable media (CRM) for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 712 may be used to store various types of content, metadata, and or other types of data (e.g., they can be used to record audio questions asked by one or more participants connected to the conference. Non-volatile memory may also be used (e.g., to launch a boot-up routine and other instructions). Cloud-based storage may be used to supplement or instead of storage 712. The storage 712 may store instructions for implementing one or more video conferencing functions described herein, such as those described as being implemented by the server 702, the server 303 (shown in FIG. 3), or any other server described herein as facilitating the described video conferencing techniques.

Communication network 703 may allow communication between user device 701a through 701N and server 702 and may include communication links such as those described in regard to FIG. 3. Communication network 703 may comprise one or more network systems, such as, without limitation, an Internet, LAN, WiFi or other network systems suitable for audio visual processing applications. In some embodiments, server 702 works in conjunction with one or more components of communication network 703 to implement certain functionality described herein in a distributed or cooperative manner. In some embodiments, user devices 701a through 701N work in conjunction with one or more components of communication network 703 or server 702 to implement certain functionality described herein in a distributed or cooperative manner.

In some embodiments, control circuitry 705 and/or 711 execute instructions for an application stored in memory (e.g., storage 709 and/or storage 712). Specifically, control circuitry 705 and/or 711 may be instructed by the application to perform the functions discussed herein. In some implementations, any action performed by control circuitry 705 and/or 711 may be based on instructions received from the application. For example, the application may be implemented as software or a set of executable instructions that may be stored in storage 709 and/or 712 and executed by control circuitry 705 and/or 711. In some embodiments, the application may be a client/server application where only a client application resides on computing device 701a through N, and a server application resides on server 702.

Processing circuitries 710 and 714 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, Processing circuitries 710 and/or 714 may be distributed across multiple separate processors or processing units, for example, multiple of the same type of processing units (e.g., two Intel Core i7 processors) or multiple different processors (e.g., an Intel Core i5 processor and an Intel Core i7 processor). Processing circuitries 710 and/or 714 may be used to send and receive commands, requests, signals (digital and analog), and other suitable data. Processing circuitries 710 and/or 714 in some embodiments is in communication with storage 709 and 712 respectively as well as any existing input or output transceivers.

Processing circuitries 710 and/or 714 may include video-generating circuitry. Encoding circuitry may also be included. Processing circuitries 710 and/or 714 may be used to receive and to display, to play, or to record content.

The systems and processes discussed above are intended to be illustrative and not limiting. One skilled in the art would appreciate that the actions of the processes discussed herein may be omitted, modified, combined, and/or rear-ranged, and any additional actions may be performed with-out departing from the present scope. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodi-ment may be combined with any other embodiment in a suitable manner, done in different orders, or done in parallel. As used herein, any reference to "one embodiment" or "an embodiment" means that a particular element, feature, struc-ture, or characteristic described in connection with the embodiment is included in at least one embodiment. The appearances of the phrase "in one embodiment" in various places in the specification are not necessarily all referring to the same embodiment. In addition, the systems and methods described herein may be performed in real time. It should also be noted that the systems and/or methods described above may be applied to, or used in accordance with, other systems and/or methods.

The invention claimed is:

1. A method comprising:

identifying, at a server, a video feed being captured by a first device for a video conference involving the first device and a second device;

receiving, at the server, a user request to modify the video feed from the second device, wherein the second device receives the video feed, and wherein the user request was generated based at least in part on determining that a quality of the video feed is below a threshold video quality for the second device;

transmitting, at the server, instructions to the first device to modify the encoding of the video feed, wherein the modifying comprises reducing the resolution of a back-ground of the video feed;

receiving the modified video feed at the server; and transmitting, from the server, the modified video feed to the second device.

2. The method of claim 1, wherein determining the threshold video quality comprises determining an allocated bitrate.

3. The method of claim 1, wherein determining the threshold video quality is based on a position or size of the first video on the display of the second participant.

4. The method of claim 1, wherein the instructions further comprise an instruction to apply a static background to the video feed.

5. The method of claim 1, wherein the instructions further comprise an instruction to apply blurring to the background of the video feed.

6. The method of claim 1, wherein the instructions further comprise an instruction to, adjust a setting of the video feed, and wherein the setting is specified by the user request.

7. The method of claim 1, wherein the transmitting the instructions is triggered by a condition of the first video.

8. The method of claim 1, further comprising receiving metadata associated with the first video and modifying the first video based on the received metadata.

9. The method of claim 1, wherein modifying the encod-ing of the video feed occurs at the first device.

10. A system comprising:

processing circuitry configured to:

identify, at a server, a video feed captured by a first device for a video conference involving the first device and a second device;

receive, at the server, a user request to modify the video feed from the second device, wherein the second device receives the video feed, and wherein the user request was generated based at least in part on determining that a quality of the video feed is below a threshold video quality for the second device;

transmit, at the server, instructions to the first device to modify the encoding of the video feed, wherein the modifying comprises reducing the resolution of a background of the video feed;

receive the modified video feed at the server; and transmit, from the server, the modified video feed to the second device.

11. The system of claim 10, wherein determining the threshold video quality is based on a position or size of the first video on the display of the second participant.

12. The system of claim 10, wherein the instructions further comprise an instruction to adjust a setting of the video feed, and wherein the setting is specified by the user request.

13. The system of claim 10, wherein the processing circuitry is configured to transmit the instructions based, at least in part on, being triggered by a condition of the first video.

14. The system of claim 10, wherein the processing circuitry is further configured to transmit the modified video feed to a third device.

15. The system of claim 10, wherein the video feed is a first video feed, and wherein the processing circuitry is further configured to:

receive, at the server, a second video feed captured from a third device; and transmit the second video feed to the second device.

16. The system of claim 10, wherein the processing circuitry is further configured to receive metadata associated with the video feed and modify the video feed based on the received metadata.

17. The system of claim 10, wherein the instructions further comprise an instruction to apply blurring to the background of the video feed.

18. The system of claim 10, wherein the modifying the encoding of the video feed occurs at the first device.

19. The method of claim 8, wherein the metadata indicates a shape of a foreground of the video feed.

20. The system of claim 16, wherein the metadata indicates a shape of a foreground of the video feed.

* * * * *